No. 745,194. PATENTED NOV. 24, 1903.
P. KENNEDY.
REGULATOR FOR ELECTRIC CURRENTS.
APPLICATION FILED JULY 8, 1903.
NO MODEL. 5 SHEETS—SHEET 1.

Witnesses Inventor
Patrick Kennedy
By his Attorney

No. 745,194. PATENTED NOV. 24, 1903.
P. KENNEDY.
REGULATOR FOR ELECTRIC CURRENTS.
APPLICATION FILED JULY 8, 1903.
NO MODEL. 5 SHEETS—SHEET 3.

Witnesses
Inventor
Patrick Kennedy
By his Attorney

No. 745,194. PATENTED NOV. 24, 1903.
P. KENNEDY.
REGULATOR FOR ELECTRIC CURRENTS.
APPLICATION FILED JULY 8, 1903.
NO MODEL. 5 SHEETS—SHEET 4.
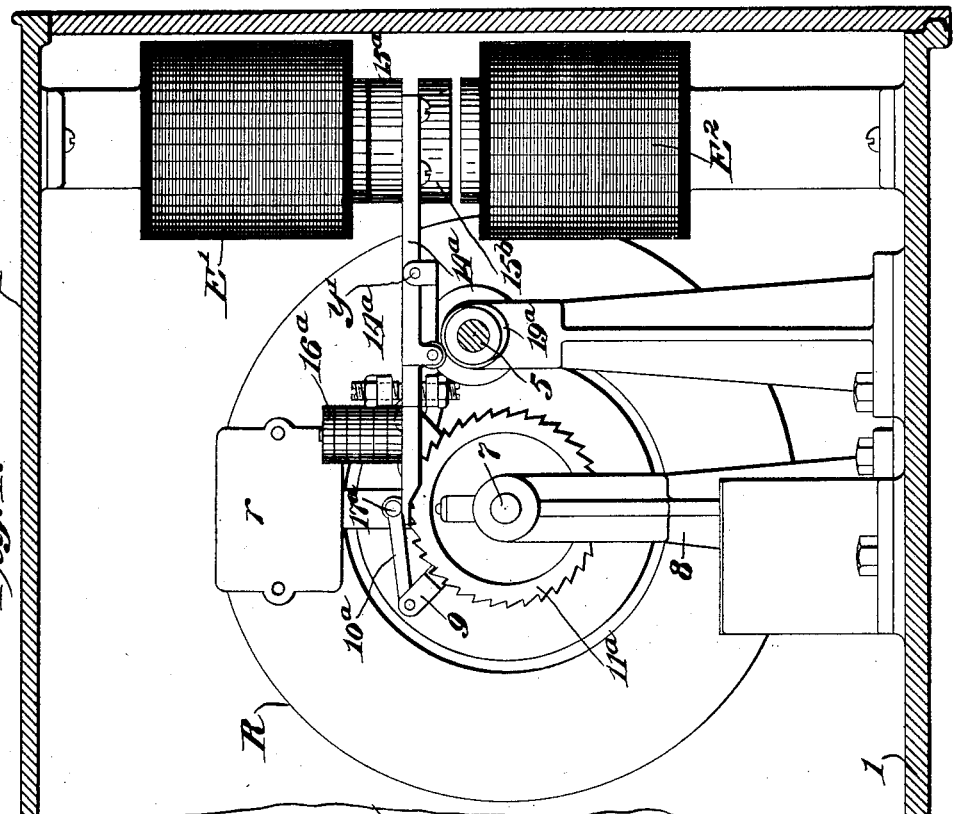
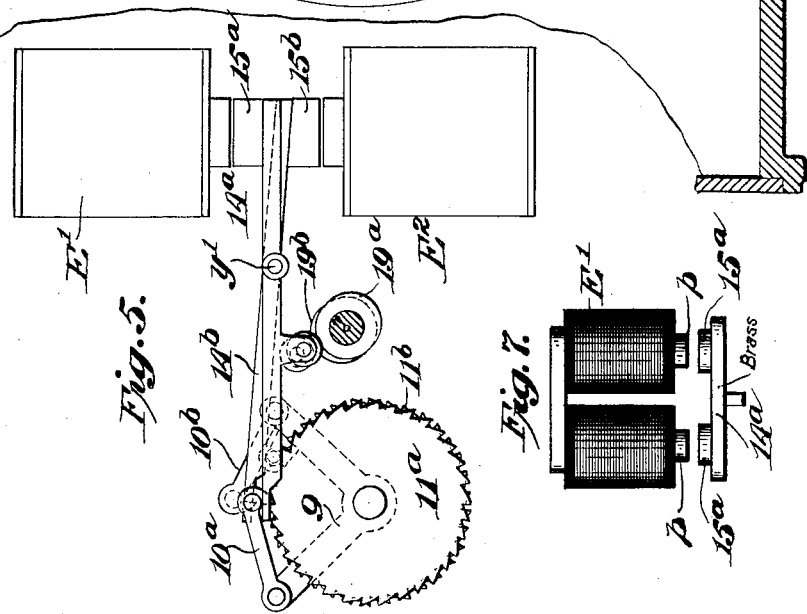
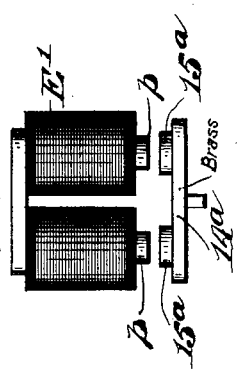
Witnesses
Inventor
Patrick Kennedy
By his Attorney No. 745,194. PATENTED NOV. 24, 1903.
P. KENNEDY.
REGULATOR FOR ELECTRIC CURRENTS.
APPLICATION FILED JULY 8, 1903.
NO MODEL. 5 SHEETS—SHEET 5.
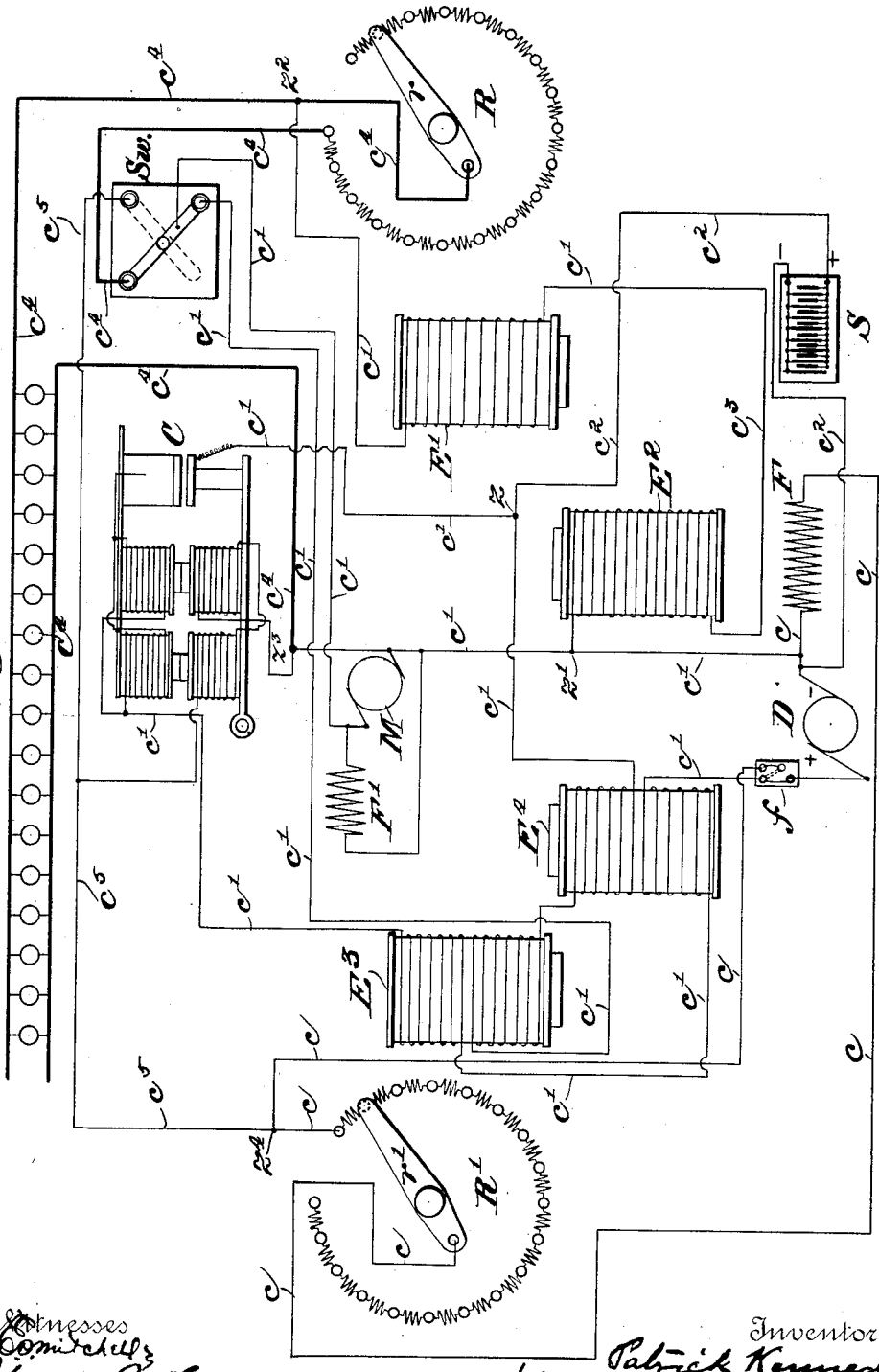

No. 745,194. Patented November 24, 1903.

UNITED STATES PATENT OFFICE.

PATRICK KENNEDY, OF NEW YORK, N. Y., ASSIGNOR TO CONSOLIDATED RAILWAY ELECTRIC LIGHTING AND EQUIPMENT COMPANY, A CORPORATION OF NEW JERSEY.

REGULATOR FOR ELECTRIC CURRENTS.

SPECIFICATION forming part of Letters Patent No. 745,194, dated November 24, 1903.

Application filed July 8, 1903. Serial No. 164,650. (No model.)

*To all whom it may concern:*

Be it known that I, PATRICK KENNEDY, a citizen of the United States, residing in the borough of Brooklyn, in the county of Kings and city and State of New York, have invented certain new and useful Improvements in Regulators for Electric Currents, of which the following is a specification.

This invention relates to means for regulating and controlling electric currents, and particularly those used for lighting railway-cars and generated by a dynamo driven from the car-axle. In lighting cars from a dynamo driven in this manner great difficulty has been experienced in automatically regulating the exterior current fed by the dynamo in order to maintain such current substantially uniform and to adapt such regulation automatically to altered conditions when a series of lamps, for example, in said exterior circuit is thrown in or cut out, and, so far as I am aware, none of the devices heretofore employed for this purpose has been able to provide such close and accurate regulation as is required.

The present invention provides an extremely-sensitive regulator which operates automatically and under all the varying conditions.

One of the important features of the invention is the employment of electromagnets in lieu of solenoids for controlling the pawls of the ratchet devices which operate the arms of the rheostats, as will be hereinafter more fully set forth, and cams whose function it is to put the armatures of the respective magnets at regular and frequent periods into their normal positions, as will be hereinafter explained.

Figure 1:
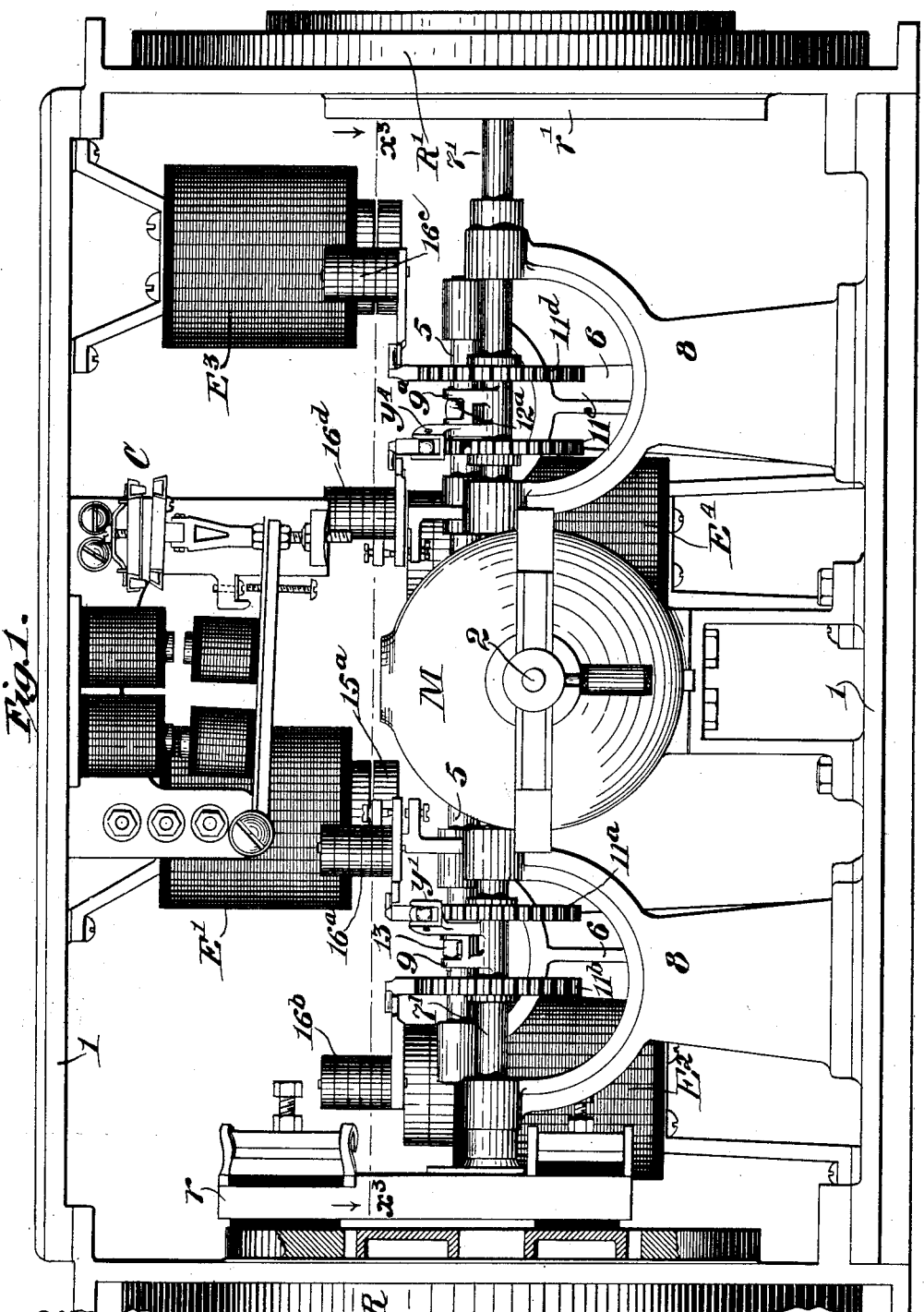
Figure 2:
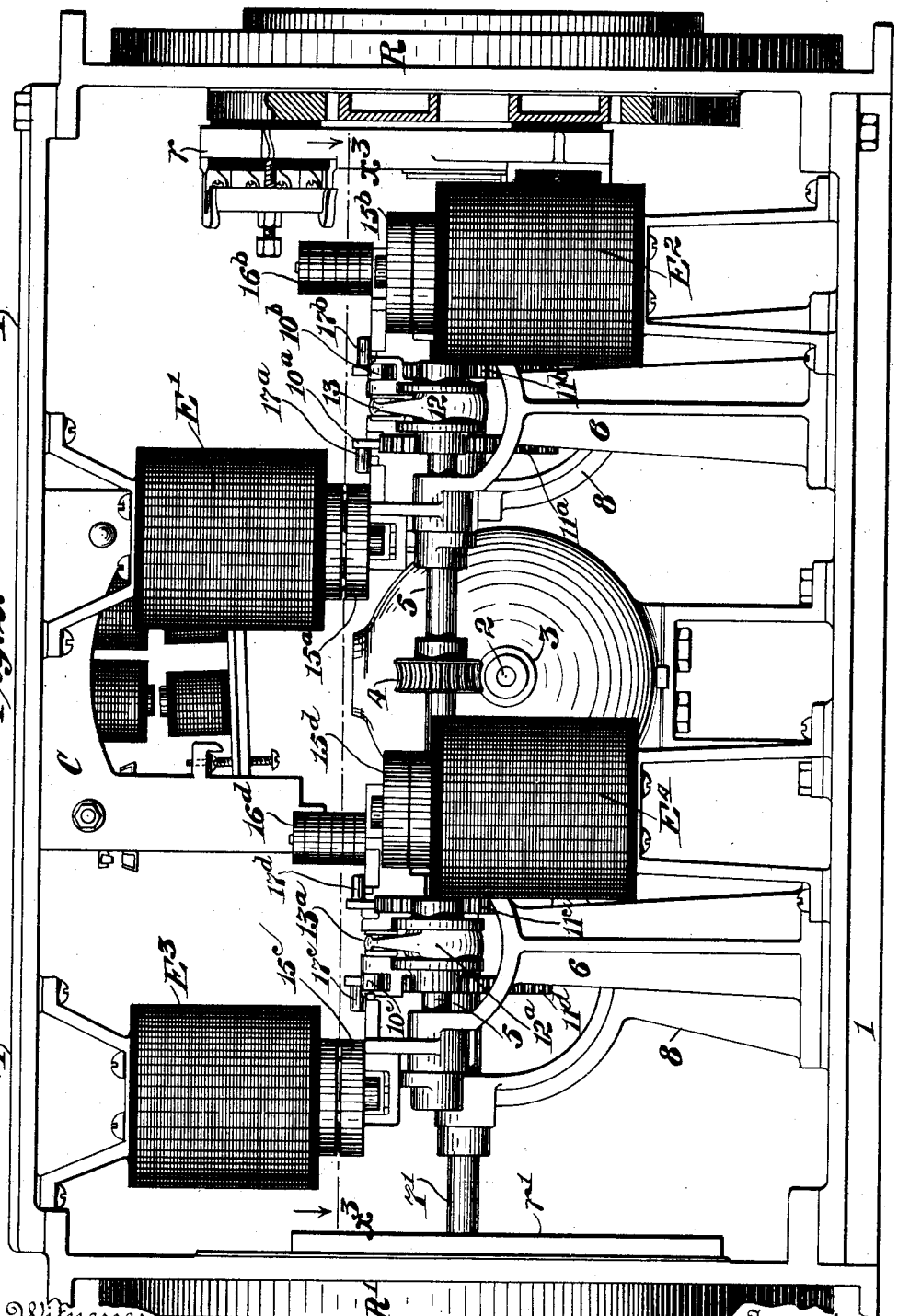
Figure 3:
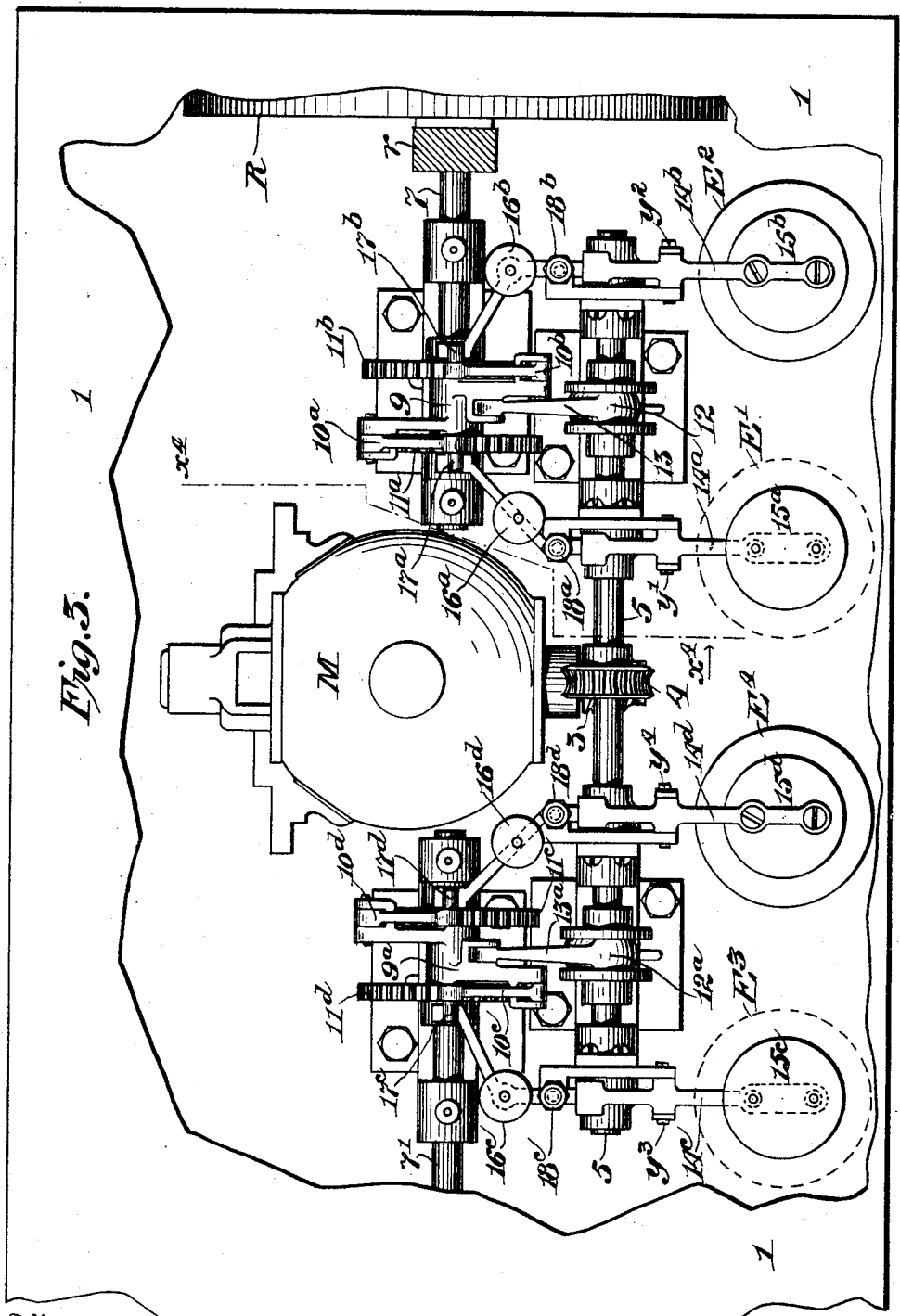

In the accompanying drawings, which illustrate an embodiment of the invention as adapted to the electric lighting of cars from a dynamo driven from the car-axle, Figure 1 is a front elevation of the regulating apparatus. Fig. 2 is a rear elevation of the same. Fig. 3 is a sectional plan of the same at line $x^3$ in Figs. 1 and 2. Fig. 4 is a transverse section at line $x^4$ in Fig. 3. Fig. 5 is a detached illustrative view showing the cam mechanism. Fig. 6 is a diagrammatic view illustrating the electrical devices and circuits. Fig. 7 shows the preferred form of electromagnet and armature.

Before proceeding to describe the invention in detail it may be of advantage to state that in the present construction the object is primarily to effect the regulation of the current supplied without breaking the circuit and to regulate both the amperage and the voltage of the current. An automatic circuit-closer is employed to connect the dynamo with the system when the voltage shall have reached a predetermined limit. In the system is a series of lamps to be supplied, a storage battery, and a small electric motor which operates the rheostats of the lamp-circuit and the field-magnet circuit of the dynamo, the former for regulating the voltage and the latter for regulating the amperage. When the lamps are turned on, they are supplied from the storage battery if the dynamo is not running. If the lamps are turned off, the motor stops, unless the dynamo is running; but the motor always runs if the dynamo is in operation, provided the speed attained by the latter is sufficient to generate a current of the normal voltage to supply the system. Whenever the current is sufficient and the lamps are turned on, the motor is set in motion.

Referring, primarily, principally to the diagrammatic view Fig. 6, D designates the dynamo; F, its field-magnets; M, a small motor supplied from the dynamo; F', its field-magnets; S, a storage battery charged by the dynamo; L, a series of lamps in the exterior lamp-circuit and supplied by either the dynamo or storage battery. $S^w$ is a switch in the lamp-circuit; R, a rheostat in the lamp-circuit; $r$, its arm. R' is a rheostat in the field-magnet circuit of the dynamo. $r'$ is its arm, and C is an automatic circuit-closing device in the exterior circuit. Some of these parts are seen only in Fig. 6.

Referring now to Figs. 1 to 5, 1 designates a suitable box-like frame to contain the mechanism. In this frame is mounted the small motor M, and at its respective ends are the rheostats R and R'.

The automatic circuit-closer C (seen above in Figs. 1, 2, and 6) is constructed in the same manner, by preference, as that described in my United States Patent No. 706,759, of August 12, 1902; but I do not limit myself herein to this special construction.

The actual circuit-conductors have been omitted from the principal mechanical views as unnecessary and as tending to confusion.

On the arbor 2 of the motor is a worm 3, which gears with a worm-wheel 4 on a cam-shaft 5, extending at right angles to the motor-axis and having bearings in pillars 6.

At the right in Figs. 2 and 3 are the devices for operating the arm $r$ of the rheostat R in the lamp-circuit, and at the left in said figures are the devices for operating the arm $r'$ of the rheostat R' in the field-magnet circuit. Those at the right will be first described.

On a shaft 7, mounted rotatively in pillars 8, parallel with the shaft 5, is loosely mounted a rocking pawl-carrier 9, provided with reversed gravity-pawls $10^a$ and $10^b$, adapted to engage, respectively, ratchet-wheels $11^a$ and $11^b$, fixed on said shaft 7. These ratchet-wheels have the inclined faces of their teeth reversed. If the carrier 9 be rocked to and fro while one pawl is lifted clear of the teeth of its ratchet, the other pawl will rotate the shaft 7 in one direction, and if the other pawl be lifted the pawl left in engagement will rotate said shaft in the opposite direction. The arm $r$ of the rheostat R is carried by the shaft 7. On the shaft 5 is an eccentric 12, the strap of which has a rod 13 coupled to the carrier 9 for rocking the latter when the shaft 5 rotates. The pawls $10^a$ and $10^b$ are hook-pawls, as best seen in Fig. 5. As shown in this figure, the pawl $10^a$ rotates the ratchet-wheel $11^a$, the shaft 7, and the arm $r$ to the left, thus throwing more resistance into the lamp-circuit, and the pawl $10^b$ rotates the wheel $11^b$ and the said shaft and arm to the right, thus cutting out more or less resistance from said circuit.

A ratchet device somewhat similar to that above described, with a solenoid and spring for controlling the pawls, is shown in my United States Patent No. 681,712, of September 3, 1901.

The respective pawls are controlled by means which will now be described.

$E'$ and $E^2$ designate electromagnets disposed with their axes vertical, the magnet $E'$ being inverted. An armature-lever $14^a$ carries a relatively heavy armature $15^a$, the lever being fulcrumed at $y'$ and provided with a weight $16^a$ to partially neutralize the weight of the armature. Preferably this weight will be composed of apertured disks, of metal, threaded on a pin in the lever, so that more or less of the disks may be used. The arm of the lever $14^a$ opposite to the armature takes under a stud $17^a$ in the pawl $10^a$. Thus the weight of the armature tends to lift the pawl free from the teeth of the ratchet-wheel $11^a$, and when the attractive force of the magnet $E'$ is not sufficient to draw the armature up to it the pawl $10^a$ will be held uplifted. $18^a$ represents screws which form stops to limit the movements of the lever $14^a$. The magnet $E^2$ is provided with like appurtenances—namely, an armature-lever $14^b$, fulcrumed at $y^2$ and carrying an armature $15^b$ and a heavier weight $16^b$. This lever takes under a stud $17^b$ on the pawl $10^b$, and its movements are limited by stop-screws $18^b$. In this case the weight of the armature tends to move it toward the pole of the magnet in uplifting the pawl.

On the shaft 5 under the respective armature-levers are oppositely set cams $19^a$ and $19^b$, Fig. 5, which as the said shaft rotates take under the armature-levers or under suitable antifriction-rollers thereon back of the fulcrums, and under certain conditions rock the respective levers alternately. The electromagnets $E'$ $E^2$ are in series in a shunt in the lamp-circuit, and the pull on their respective armatures will be proportioned to the voltage of the current supplied to the lamps. If the current is too strong, the magnets will attract their respective armatures, and this will allow the pawl $10^a$ to engage and operate its ratchet-wheel to throw more resistance into the lamp-circuit, while the pawl $10^b$ will be held up out of engagement. If, on the other hand, a series of lamps are turned on, they will offer resistance and the current becomes weaker. The armature $15^a$ now falls away from the pole of magnet $E'$ and the pawl $10^a$ is lifted, while the weight $16^b$ overcomes the weight of the armature $15^b$, and the pawl $10^b$ is thus put into engagement to cut out resistance from the lamp-circuit at the rheostat R'.

The function of the cams $19^a$ and $19^b$ is to move the armatures $15^a$ and $15^b$ into the positions they would respectively assume and in which they would remain if the voltage in the circuit were normal and sufficient, and their purpose is to determine in the case of the magnet $E'$ whether the current is still strong enough to energize the magnet sufficiently for it to attract its armature when the latter is at its farthest distance from the pole-face of the magnet and in its normal position, and in the case of the magnet $E^2$ whether the current is yet strong enough to cause the magnet to attract and hold its armature when the latter is in its normal position close to the pole-faces of the magnet. This is important, as the attractive force of a magnet varies as the square of the distance of the armature from the pole-face, and a current strong enough to cause a magnet to hold its armature when in almost actual contact with its pole-face may not be strong enough to draw the armature to it at a distance, say, of one-eighth of an inch. Thus it will be readily seen that these successively and regularly applied tests with the cams serve to produce and permit very accurate regulation.

As the devices seen at the left in Figs. 2 and 3 and at the right in Fig. 1 for operating and controlling the arm $r'$ of the rheostat $R'$ in the field-magnet circuit of the dynamo for regulating the amperage are the same as those already minutely described, it will only be necessary to briefly refer to the parts of this device by their reference characters.

The cam-shaft 5 extends across in the frame 1. $7^a$ is a shaft carrying the arm $r'$ of the rheostat $R'$ and ratchet-wheels $11^c$ and $11^d$. A rocking pawl-carrier $9^a$ is loosely mounted on the shaft $7^a$ and carries gravity-pawls $10^c$ and $10^d$ to engage the teeth of the respective ratchet-wheels. Armature-levers $14^c$ and $14^d$ are fulcrumed at $y^3$ and $y^4$, respectively, and carry armatures $15^c$ and $15^d$ for the respective magnets $E^3$ and $E^4$. The armature-levers take under studs $17^c$ and $17^d$ on the respective pawls and carry weights $16^c$ and $16^d$. Screws $18^c$ and $18^d$ serve as stops to limit the movements of the respective armature-levers, and cams $19^c$ and $19^d$ on the cam-shaft act to operate said levers regularly and successively.

The magnets $E^3$ and $E^4$ are in the main exterior circuit fed by the dynamo and will have reverse windings of coarser wire than the magnets $E'$ and $E^2$, so as to offer less resistance.

The circuits may be traced on Fig. 6. D is a shunt-dynamo. The field-magnet circuit $c$ is from the positive brush of the dynamo to and through a fuse-block $f$ to the rheostat $R'$, thence through the arm $r'$ of the latter to the field-magnet F, and thence to the negative brush of the dynamo. The main exterior circuit $c'$ is from the positive brush of the dynamo through fuse-block $f$ to and through one winding on each of the electromagnets $E^3$ and $E^4$, thence to and through the circuit-closer C, thence to and through the reverse windings of said magnets $E^3$ and $E^4$, thence to and through the lamp-switch $S^w$, thence to and through the small motor M, and thence to the negative brush of the dynamo. The storage battery is in a branch circuit $c^2$ from $c'$ at $z$ to the negative brush of the dynamo. The magnets $E'$ and $E^2$ are in a shunt-circuit $c^3$ from $z'$ to $z^2$. The lamp-circuit proper, $c^4$, branches from the circuit $c'$ at the switch $S^w$, goes thence to and through the rheostat R, thence to and through the lamps L, and thence the point $z^3$, where it joins the circuit $c'$. This circuit $c^4$ is represented by a heavy line in Fig. 6. The switch $S^w$ is shown in this figure as closed through the lamps. When the lamps are turned off at the switch $S^w$, the current may flow through a circuit $c^5$ branching from the circuit $c$ at $z^4$, thence to the switch $S^w$, and thence by the circuit $c'$ through the motor M and to the negative brush of the dynamo. Branches from the circuits connect with the coils of the magnets of the circuit-closer C for energizing them; but these form no part of the present invention.

The electromagnets $E'$, $E^2$, $E^3$, and $E^4$ will be, by preference, horseshoe-magnets, as shown in Fig. 7—that is to say, they will have two bobbins and two pole-faces. This form of magnet is deemed better for the results to be attained herein than a magnet with a single bobbin; but in order that the armature may be sensitive to the changes in the magnetic force of the magnet it is made in two parts, one part for each pole, and these parts are insulated magnetically from each other. For example, in Fig. 7 the magnet $E'$ is a horseshoe-magnet with two pole-faces $p\ p$, and the armature-lever $14^a$ is of a non-magnetic metal, as brass, on which are secured two iron armatures $15^a\ 15^a$, one for each pole of the magnet, and magnetically insulated from each other. This specific form of electromagnet is not claimed herein, but forms the subject-matter of another application.

It has been stated above that the electromagnets $E^3$ and $E^4$, which form a part of the means for regulating the amperage of the current, have reverse windings, and the reason for this will now be explained. The windings of these magnets are all in the exterior circuit fed by the dynamo; but one set of windings is so connected in the circuit that when the lamps are turned off at the switch no current flows through these windings, and consequently the magnets are the more strongly energized by the current flowing through their coils. Therefore the armatures of the magnets are attracted strongly and overcome the weights $16^c$ and $16^d$. This has the effect to throw resistance into the circuit at the rheostat $R'$, and consequently modify the force of the magnets, as before explained, these effecting the proper regulation to suit the conditions. When the lamps are turned on and a higher amperage is needed, both windings of the magnets are energized and tending to neutralize each other serve to weaken the magnets. The armature falls away from the magnet $E^3$ and lifts the pawl $10^c$ and the weight $16^d$ sets the pawl $10^d$ into engagement with its ratchet, which has the effect to cut out resistance from the circuit.

Having thus described my invention, I claim—

1. In a device for regulating electric currents, the combination with a shunt-wound dynamo, the field-magnet circuit of the dynamo, an exterior circuit fed by the dynamo, and rheostats, one in each of said circuits, of automatic means for regulating the amperage in the field-magnet circuit through its rheostat, and automatic means for regulating the voltage in the exterior circuit through its rheostat, said regulating means comprising an electric motor in the exterior circuit, mechanisms actuated by said motor, which mechanisms operate the arms of the respective rheostats, armature levers and weights which put said mechanisms into and out of operation, electromagnets and their armatures, said magnets being energized by the current flowing in the exterior circuit and controlling said armature-levers, and means operated by said motor, which actuate said armature-levers to set them and their armatures in their normal positions at recurring intervals.

2. In a device for regulating electric currents, the combination with a dynamo, an exterior circuit fed by said dynamo, and a rheostat in said exterior circuit, of automatic means for regulating the voltage in the exterior circuit through its rheostat, said regulating means comprising an electric motor supplied by said exterior circuit, mechanisms actuated by said motor, which operate the arm of said rheostat, armature levers and weights which put said mechanisms respectively into and out of operation, electromagnets and their armatures on the respective armature-levers, said magnets being in a shunt of the exterior circuit and respectively arranged to control said rheostat-operating mechanism for throwing in and cutting out resistance from the exterior circuit, and cams, actuated by said motor, which operate said armature-levers to set them in their normal positions at recurring intervals.

3. In a device for regulating electric currents, the combination with a dynamo, an exterior circuit fed by said dynamo, and a rheostat R in said exterior circuit of the shaft 7, carrying the rheostat-arm and the ratchet-wheels $11^a$ and $11^b$, all fixed on said shaft, the rocking pawl-carrier 9, the pawls $10^a$ and $10^b$ on the said carrier and adapted to engage, respectively, the teeth of said ratchet-wheels, the cam-shaft 5, gearing whereby the motor drives said cam-shaft, means whereby said shaft rocks said pawl-carrier, the inverted electromagnet $E'$ and right electromagnet $E^2$, the coils of said magnets being in shunt in the exterior circuit, the armatures $15^a$ and $15^b$ of these magnets, the armature-levers $14^a$ and $14^b$ of the respective magnets, said levers engaging at their ends opposite the magnets projecting parts on the respective pawls $10^a$ and $10^b$, for lifting the latter out of engagement, the weights on the respective armature-levers, and the cams $19^a$ and $19^b$ on the cam-shaft under the respective armature-levers, whereby the armatures are put by said cams in their normal positions at regularly-recurring intervals.

4. In a device for regulating electric currents, the combination with a dynamo, its field-magnet circuit in shunt with the exterior circuit fed by the dynamo, the said exterior circuit, and the rheostat $R'$ in said field-magnet circuit, of means for regulating the amperage of the current supplied, said means comprising an electric motor in the exterior circuit, a shaft $7^a$ carrying the arm $r'$ of the rheostat and also two ratchet-wheels $11^c$ and $11^d$, the said wheels, a rocking pawl-carrier $9^a$, movable pawls $10^c$ and $10^d$ on said carrier and adapted to engage the teeth of the respective ratchet-wheels $11^c$ and $11^d$, a cam-shaft 7, means whereby the motor drives said cam-shaft and whereby said shaft in its rotation imparts a rocking movement to the pawl-carrier, the inverted electromagnet $E^3$ and right electromagnet $E^4$, the coils or windings of these magnets being in the exterior circuit, the armatures $15^c$ and $15^d$ of the respective magnets, the armature-levers $14^c$ and $14^d$ of the respective magnets, the arms of said levers opposite to the magnets taking under projecting parts of the respective pawls to lift the same out of engagement, the weights on said levers, and the cams $19^c$ and $19^d$ on said cam-shaft under the respective levers $14^c$ and $14^d$ and adapted to rock the latter and thus put the respective armatures carried by the levers in their normal positions at regularly-recurring intervals.

5. In a device for regulating electric currents, the combination with a dynamo, an exterior circuit fed by said dynamo, a series of lamps in a part of said exterior circuit, a switch for cutting the lamps out of the main circuit, a rheostat in the main circuit, and mechanism for operating the arm of said rheostat, of armature-levers and weights which put said mechanism into and out of operation and electromagnets and their armatures on the respective armature-levers, said magnets having reverse windings, one set of windings being in circuit with the lamps in and adapted to be cut out when the lamps are cut out, substantially as and for the purpose set forth.

In witness whereof I have hereunto signed my name, this 26th day of June, 1903, in the presence of two subscribing witnesses.

PATRICK KENNEDY.

Witnesses:
H. ALAN CONNETT,
WILLIAM J. FIRTH.